US005177852A

United States Patent [19]

James

[11] Patent Number: 5,177,852

[45] Date of Patent: Jan. 12, 1993

[54] UNIVERSAL JOINT PULLER

[76] Inventor: William G. James, 855 Rte. 113, Harleysville, Pa. 19438

[21] Appl. No.: 819,711

[22] Filed: Jan. 13, 1992

[51] Int. Cl.[5] ........ B23P 19/04

[52] U.S. Cl. ........ 29/259

[58] Field of Search ........ 29/257-261, 29/263, 264; 269/130-132

[56] References Cited

U.S. PATENT DOCUMENTS 3,076,259 2/1963 Stebbins ........ 29/259

4,463,489 8/1984 James ........ 29/261

*Primary Examiner*—Robert C. Watson

*Attorney, Agent, or Firm*—Diller, Ramik & Wight

[57] ABSTRACT

The universal joint puller includes three members, one of which is a tubular sleeve having a flange and housing therein a compression spring and an abutment plug. The flange is seated against a drive shaft or universal shaft yoke and a force is applied through a screw and a pair of cables to force a cross or spider in a direction to move an associated bearing assembly toward and against the abutment plug and the opposing force of the compression spring. The latter construction permits the universal joint puller to be utilized with vehicles below 26,000 lbs. vehicle gross weight which do not have threaded bearing assembly cover plate bores associated with the yokes.

52 Claims, 3 Drawing Sheets

UNIVERSAL JOINT PULLER

BACKGROUND OF THE INVENTION

The invention is directed to a universal joint puller for disassembling a universal joint, including its cross and bearing assembly, from the drive shaft yoke, transmission shaft yoke or the like.

Typical universal joint pullers are disclosed in U.S. Pat. Nos. 3,846,891 and 4,019,233 issued on Nov. 12, 1974 and Apr. 26, 1977, respectively, to Carl L. Elg and James E. Jirele, respectively. In both of these patents a screw is utilized to apply a relative force between a pair of movable plates with one of the plates being connected by threaded studs to threaded bores of a drive shaft or universal shaft yoke, while the other member which carries the screw is connected by pivoted arms and connectors/adapters to the arms of a yoke from which a bearing cap is not being removed. While these universal joint pullers are generally effective for the intended purposes, each includes various undesirable characteristics, and the latter have been overcome for the most part by the patent's earlier invention disclosed in U.S. Pat. No. 4,463,489 granted on Aug. 7, 1984. In this patent adapters are unnecessary and flexible cables are utilized to apply the necessary force in conjunction with an associated threaded screw. However, the latter universal joint puller is designed to accommodate relatively large vehicles, such as 26,000 lbs. vehicle gross weight and above, in which the yokes of the drive and/or universal shafts have threaded openings for cover plate bolts which, when removed, receive threaded ends of guide rods of the universal joint puller. There are, of course, many vehicles, such as smaller size trucks, pick-up trucks, some four-wheel drives and generally trucks in the range of 10,000 lbs.-26,000 lbs. vehicle gross weight, which do not have threaded yokes and, thus, will not accommodate the universal joint puller of U.S. Pat. No. 4,463,489.

SUMMARY OF THE INVENTION

In keeping with the foregoing, the present invention is directed to an extremely versatile universal joint puller which will accommodate most vehicles, but particularly those lacking threads associated with the yokes of conventional drive shaft or universal shaft yokes which are found normally in vehicles whose vehicle gross weight is below 26,000 lbs., pick-up trucks, small four-wheel drive vehicles, and similar conventional smaller size trucks. The universal joint puller accommodates vehicles generally between 10,000 lbs.-26,000 lbs. vehicle gross weight.

In accordance with the present invention, the universal joint puller carries a cylindrical member having an axial abutment surface which rests against an axial face of an associated yoke housing a bearing assembly. A pair of flexible members are associated with another member and a threaded screw such that upon threading of the screw, an associated cross is drawn toward the cylindrical member resulting in the forceful withdrawal of the bearing assembly from the arm of the associated yoke and into an interior chamber of the cylindrical member.

In further accordance with the present invention, the cylindrical member includes an inwardly directed peripheral flange which limits the motion of an abutment member or plug with the latter being spring-biased by a compression spring, also located in the interior of the cylindrical/tubular member, in a direction toward the peripheral flange. Upon the removal of an associated bearing assembly, the bearing assembly is first forced progressively outwardly from the yoke and against the plug or abutment member which progressively moves axially inwardly relative to the cylindrical/tubular member and against the bias of the compression spring. The compression spring ultimately ejects the removed bearing assembly from the tubular member upon the unthreading of the screw and the loosening of the flexible members.

Preferably the cylindrical member is also provided with a threaded flange which can be secured to a pair of guide rods corresponding to the pair of guide rods disclosed in U.S. Pat. No. 4,463,489. Thus, a person owning/utilizing a universal joint puller of U.S. Pat. No. 4,463,489 can utilize the same for yokes lacking threaded cover plate bores by simply utilizing the tubular member/adapter of the present invention in association with two guide rods which lack the integral annular means or shoulders of the guide rods of the latter-identified patent. Thus, the present invention not only constitutes an improvement of that disclosed in U.S. Pat. No. 4,463,489, but also renders the patented universal joint puller more versatile by extending the range thereof to lesser weight vehicles and/or those lacking threaded cover plated bores in the yokes thereof, as earlier described.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENT

Figure 1:
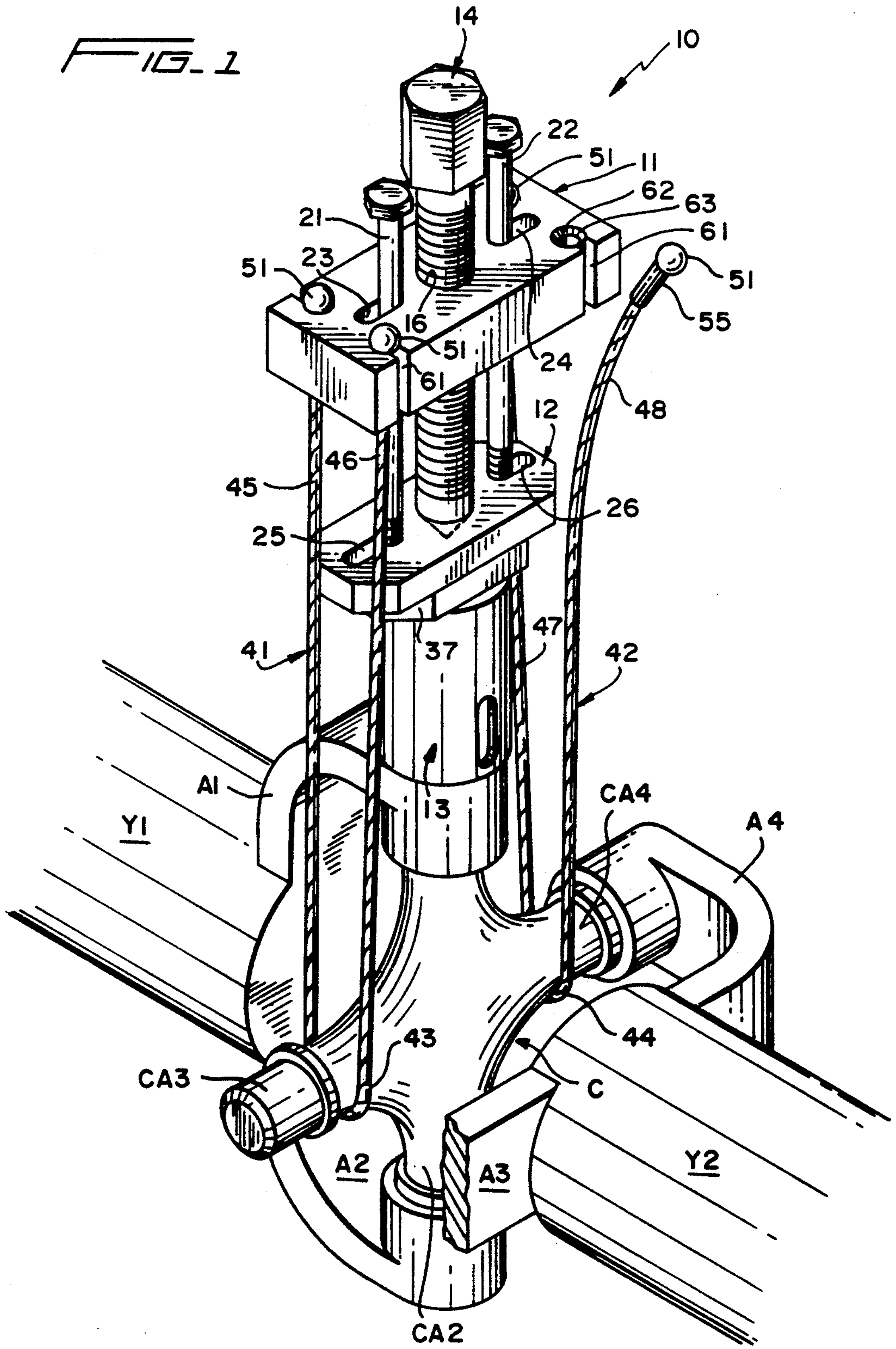
FIG. 1 is a perspective view with portions broken away for clarity of a novel universal joint puller constructed in accordance with this invention, and illustrates a pair of members having openings slidably receiving a pair of guide members whose lower threaded ends are threaded into threaded bores of a tubular member which bears against a yoke arm and applies a force thereto upon the rotation of a threaded screw in association with a pair of flexible cables.
Figure 2:
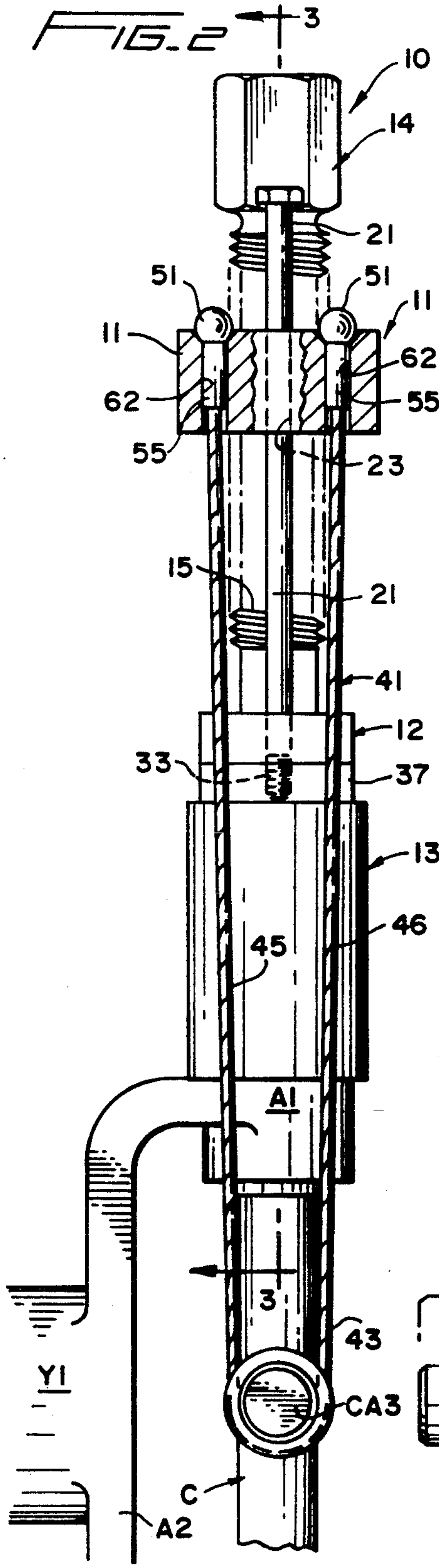
FIG. 2 is a fragmentary side elevational view with portions broken away for clarity of the universal joint puller of FIG. 1, and illustrates the relationship of the threaded screw, the latter-noted members, and one of the two pair of flexible cables.
Figure 3:
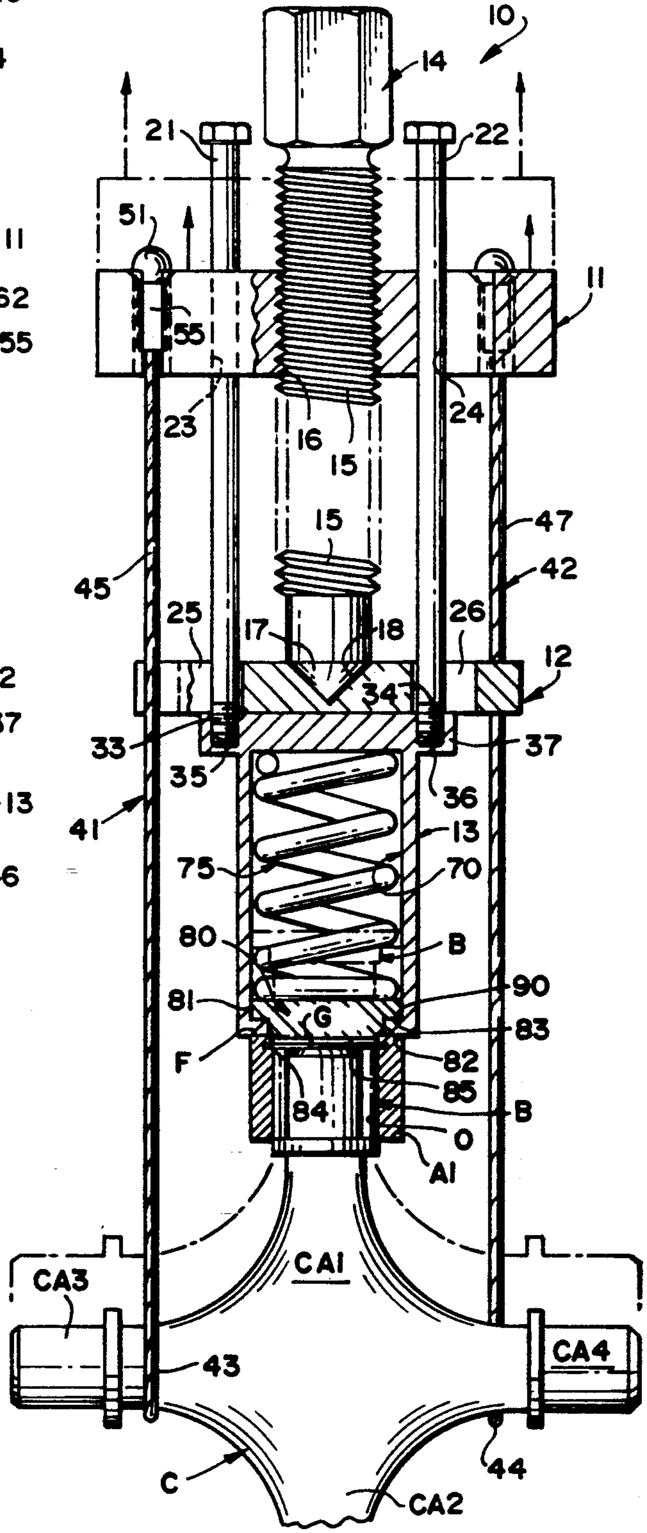
FIG. 3 is a fragmentary cross-sectional view taken generally along line 3—3 of FIG. 2, and illustrates details of the tubular member including an inner surface defining a chamber housing a compression spring which bears against an abutment member or plug.
Figure 4:
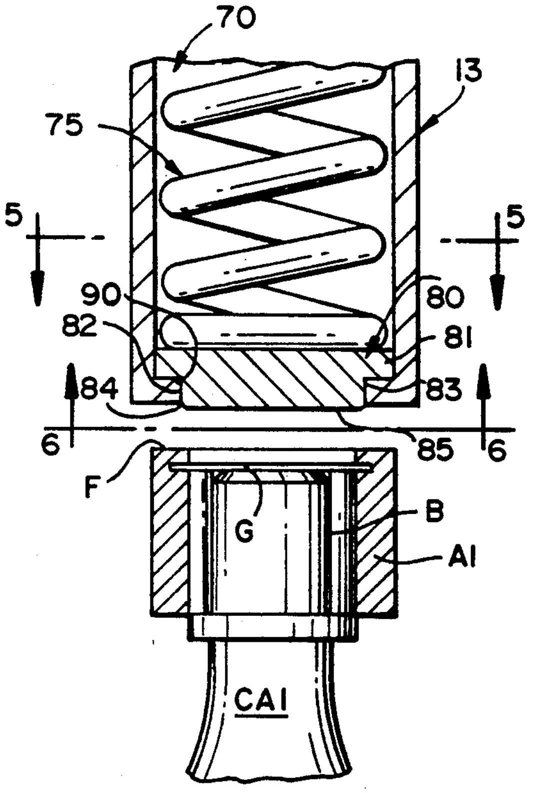
FIG. 4 is an enlarged fragmentary cross-sectional view of a portion of the tubular member, yoke and the bearing assembly of an associated arm of a universal joint cross or spider, and illustrates the axial alignment therebetween prior to initiating bearing assembly removal.
Figure 6:
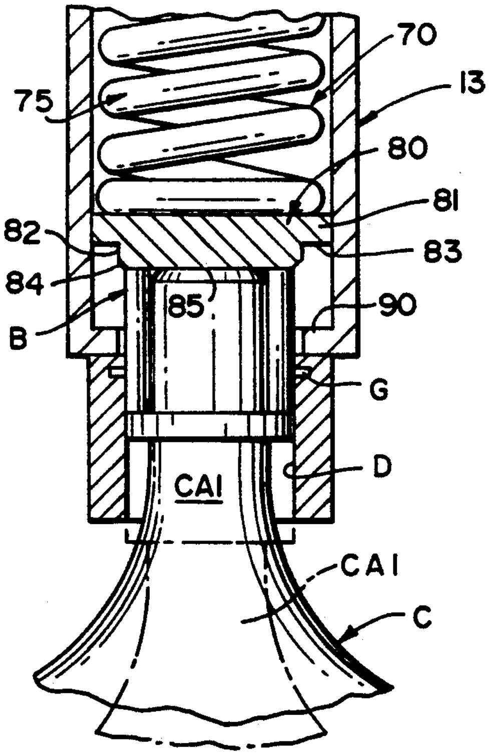
FIG. 6 is a fragmentary cross-sectional view corresponding to FIG. 4, and illustrates the bearing assembly partially removed from the yoke during which the compression spring is progressively compressed and the abutment member or plug recedes into the tubular member.

A novel universal joint puller for disassembling a universal joint is illustrated in FIGS. 1 through 3 of the drawings, and is generally designated by the reference numeral 10.

The universal joint puller 10 is associated with and is illustrated attached to a pair of conventional drive shaft and/or transmission shaft yokes Y1 and Y2, each having respective pairs of arms A1, A2; A3, A4 which have openings, such as the opening O of the arm A1 which receives therein a bearing assembly B which is of a conventional construction and is normally retained in the position illustrated in FIG. 3 relative to a cross arm CA1 of a universal joint cross or spider C by a retaining ring (not shown) snapped into and correspondingly removed from a groove G (FIG. 3). The cross arm or spider C also includes three other arms CA2–CA4). It should be particularly noted that the arms A1–A4 exclude threaded bores corresponding to those of U.S. Pat. No. 4,463,489 which receive threaded bolts T for securing cover plates over associated bearing assemblies. The latter is commonly associated with relatively heavy vehicles (above 26,000 lbs. vehicle gross weight), whereas as earlier noted herein, the present invention is directed to generally lighter weight vehicles between the latter vehicle gross weight and 10,000 lbs. vehicle gross weight which, as shown particularly in FIG. 3, lack threaded cover plate bores in the arms A1 of the yokes Y1, Y2. Due to the absence of such threaded bores, the universal joint puller of U.S. Pat. No. 4,463,489 cannot be utilized, without adaptation, to remove the bearing assemblies B from cross arms CA1–CA4 associated with unthreaded yokes/yoke arms.

The universal joint puller 10 includes a first relatively movable member or plate 11, a second relatively movable member or plate 12, and a third relatively movable tubular member or sleeve 13 which are adapted to be moved between a first position (solid lines in FIGS. 2 and 3) at which the member 11 is relatively close to the members 12, 13 and a second position (phantom outline in FIG. 3) in which the member 11 is spaced further relative to the members 12, 13. Means in the form of a screw 14 having a threaded shank 15 is threaded in a threaded through bore 16 of the member 11 and functions as means for applying a force between the first member 11 on one hand, and the second and third members 12, 13, respectively, on the other hand, to move the same between the first and second positions heretofore noted incident to removing the bearing assembly B from the opening O of the arm A1, as illustrated by the phantom outline position of the partially removed bearing assembly B in FIG. 3.

A lower end portion (unnumbered) of the screw 14 terminates in a conical head 17 which seats in an upwardly opening conical recess 18 of the second member 12 whereby upon appropriate rotation of the screw 14, the member 11 will move away from the members 12, 13, and this force will be transmitted to the cross C in the manner described in U.S. Pat. No. 4,463,489, and which will be described hereinafter.

A pair of rods 21, 22 pass through respective elongated bores or slots 23, 24 of the member 11 and through respective elongated bores or slots 25, 26 of the member 12. The slots 23, 25 and 24, 26 are in general vertical alignment and serve to guide the sliding motion of the first member 11 relative to the rods 21, 22 and relative to both of the members 12, 13.

The rods 21, 22 have terminal threaded ends or end portions 33, 34, respectively, which are threaded into threaded bores 35, 36, respectively, of a flange 37 of the member 13.

A pair of flexible cables 41, 42 include respective medial or bight portion 43, 44 and ends 45, 46; 47, 48. Each of the ends 45–48 has crimped thereto an enlarged head 51 through an associated crimped tubular stem 55. The diameter of the flexible cables 41, 42 is slightly smaller than that of slots 61 formed in the member 11 which open into larger cylindrical bores 62, each of which in turn flares axially into a frusto-conical seat 63 sized to accommodate the heads or balls 51. FIGS. 1 and 3 illustrate the relationship of the latter-defined elements during the operation of the universal joint puller 10.

The tubular member or sleeve 13 includes an internal surface defining chamber means or access means 70 for receiving therein the bearing assembly B upon removal thereof from the universal joint cross arm CA1. In addition, the chamber means or chamber 70 accommodates biasing means in the form of a compression spring 75 for imposing a force against the bearing assembly B in opposing relationship to the direction of removal of the bearing assembly B from its universal joint cross arm CA1. The force imposed by the force imposing means or compression spring 75 operates through abutment means 80 in the form of an abutment plate, abutment member or plug having a large cylindrical portion or flange 81 and a smaller cylindrical portion 82 setting-off therebetween an annular shoulder 83. A chamfer 84 is set-off between the portion 82 and an axial end face 85 of the plug 80. The exterior circumference of the flange 81 corresponds generally to the interior circumference of the chamber 70 which provides relative guidance during the movement of the member 80 within the tubular member 13 between the solid and phantom outline positions illustrated in FIG. 3. A radially inwardly directed flange 90 of the tubular member 13 has an internal circumference corresponding generally to the external circumference of the smaller cylindrical portion 82 of the member 80, as is best shown in FIG. 3. The latter relationship accurately locates the member 80 generally coaxial with the cross arm CA1 and the bearing assembly B therein. The flange 90 underlies the flange 81 and, obviously, prevents the member 80 from downwardly exiting the chamber 70, as viewed in FIG. 3, under the influence of the compression spring 70. The tubular member 13 including the flange 90 thereof define means for bearing against an end face F of the yoke A1 and prevent movement thereof during relative movement of the first member 11 with respect to the second and third members 12 and 13, respectively, during rotation of the screw 14 which moves the latter-defined members from the first toward the second defined positions thereof, as will be more apparent immediately hereinafter in the description of the operation of the universal joint puller 10.

The universal joint puller 10 is utilized by removing any cover plates (not shown) from the yokes A1–A4, and assembling the universal joint puller 10 in the manner best illustrated in FIGS. 1 through 3 of the drawings. In the latter figures, the bight portions 43, 44 partially encompass the respective cross arms CA3, CA4 from which the bearing assemblies (not shown) have been earlier removed. The retaining ring (not shown) has also been removed from the groove G and the flange 90 of the tubular member 13 abuts against the end face F of the yoke A1. The smaller cylindrical portion 82 of the member 80 projects at least partially into the opening O. The chamfer 84 functions to self-center the smaller cylindrical portion 82 within the opening O and, thus, also automatically self-centers the tubular sleeve 13 with its axis (not shown) coincident/concentric to the axis (not shown) of the arm CA1 and the bearing assembly B. The latter self-centering assures that the removal forces will be applied parallel to the latter-defined axes which in turn applies uniform removing force without cocking or canting the universal joint puller 10 relative to the cross arm or spider C which could result in damage being caused to the bearing assembly B and/or to the bearing surfaces associated therewith upon the removal of the bearing assembly B from the opening O.

When positioned as best shown in FIG. 3, the screw 14 is rotated clockwise which causes the first member 11 to move upwardly, as indicated by the unnumbered headed arrows associated therewith. During the upward movement of the first member 11, the cables 41, 42 impart a force to the cross arms CA3, CA4 pulling the cross C upwardly, while, of course, the yoke A1 is held stationary by the flange 90 bottoming against the end face F. The cross C moves upwardly toward and beyond the phantom outline position thereof shown in FIG. 3 which progressively moves the cross arm CA1 and the bearing B surrounding the same upwardly against the member/plug 80 and the force exerted downwardly thereagainst by the spring 75. As the latter occurs, the member 80 is pushed upwardly into the chamber 70 as the spring 75 progressively compresses during which time the bearing assembly B progressively accesses/enters the chamber 70 until total disassembly of the bearing assembly B has been completed. The threaded screw 14 is then threaded in the opposite direction to release the force which in turn permits the cross arm C to descend along with the yoke A1 which in turn allows the spring 75 to progressively extend and project the removed bearing assembly B outwardly of the chamber 70 thereby effecting the complete removal thereof.

It should be noted that the bearing assembly B can be removed in the absence of the coil spring 75 and the member 80, but absent the coil spring 75 and the member 80, the bearing assembly B might be damaged should the extremely high force of the screw 14 be transmitted in an abrupt fashion to the bearing assembly B. For example, as the screw 14 is progressively turned, the removal force which is transferred by the cables 41, 42 to the bearing assembly B through the cross C progressively increases. However, this does not mean that the cross C and the bearing assembly B are progressively moved. The bearing assembly B can be "frozen" in the opening O and will not perhaps dislodge until an extremely high force is created under the influence of the screw 14, but once this force is reached, the bearing assembly B would virtually be ejected at a high speed from the opening O. This would, in the absence of the member 80 and the spring 75, result in the bearing assembly B being driven against the unnumbered top or rear wall of the chamber 70 resulting in bearing assembly/cage damage to what might otherwise be a perfectly structurally sound bearing assembly. However, such abrupt transfer of the removal force is virtually lessened/reduced by the counter balancing or opposing force of the spring 75 thereby preventing damage to any undamaged bearing assembly B during the removal thereof from the cross arms CA1–CA4.

Figure 8:
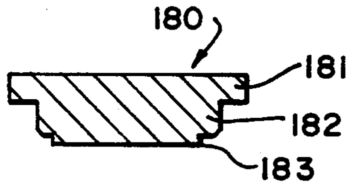
FIG. 8 is a cross-sectional view of a modified abutment member or plug, and illustrates two cylindrical projections of different diameters for accommodating the removal of different sizes of bearing assemblies from associated yokes/cross arms.
Figure 5:
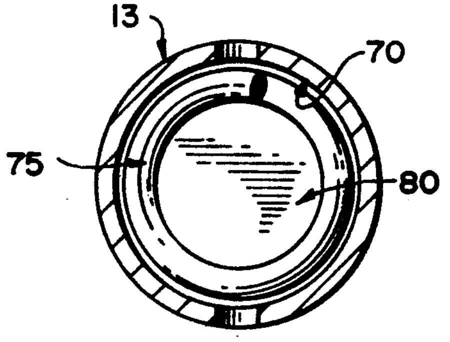
FIG. 5 is a cross-sectional view taken generally along line 5—5 of FIG. 4, and illustrates the coaxial relationship of the compression spring, the plug and the tubular member.
Figure 7:
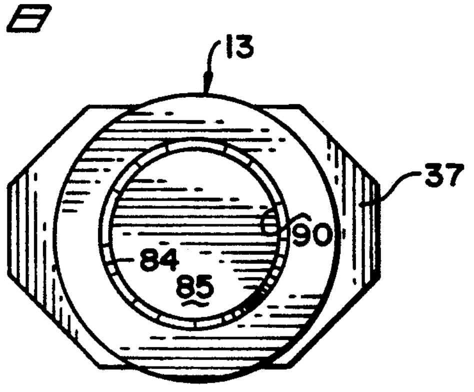
FIG. 7 is a cross-sectional view taken generally along line 7—7 of FIG. 4, and illustrates a radially inwardly directed peripheral flange of the tubular member and a chamfered end of the abutment member or plug.

In addition to accommodating the removal of bearing assemblies of smaller or lighter weight vehicles, the universal joint puller 10 of the present invention is also designed to accommodate the removal of bearing assemblies of varying circumferences/diameters by means of a abutment member or plug 180 (FIG. 8) corresponding identically to the abutment member or plug 80 in the sense of including both a relatively large circumferential portion or flange 181 and a relatively smaller cylindrical portion 182. However, the abutment member 180 also includes a further smaller cylindrical portion 183 which can be introduced into openings of yokes smaller than the openings O of the various yokes A1, A2, etc. Thus, while the cylindrical portion 82 enters into and self-centers relative to the opening O, if the opening O were of a lesser diameter/circumference, the cylindrical portion 183 of the abutment member 180 would similarly enter into and self-center relative to such a smaller opening, but otherwise the operation of the universal joint puller 10 would be the same as that heretofore described.

Although a preferred embodiment of the invention has been specifically illustrated and described herein, it is to be understood that minor variations may be made in the apparatus without departing from the spirit and scope of the invention, as defined the appended claims.

I claim:

1. A universal joint puller for disassembling a universal joint including its cross and bearing assembly from a drive shaft yoke, universal shaft yoke or the like comprising first and second relatively movable members adapted to be moved between a first relatively adjacent position and a second relatively spaced position, means for applying a force between said first and second members to move the same from said first position to said second position incident to removing a bearing assembly from an arm of an associated universal joint cross, a pair of flexible cable means for entraining arms of the cross generally normal to the arm from which a bearing assembly is to be removed, each of said pair of flexible cable means having opposite ends connected to said first member whereby upon operation of said force applying means said movable members are moved from said first position toward said second position, means for bearing against an end face of a yoke and preventing movement thereof during relative movement of said first and second members toward said second position, said bearing means further defining access means for receiving therein a bearing assembly upon the removal thereof from its associated universal joint cross arm upon said relative movement of said first and second members toward said second position, and means for imposing a force against a bearing assembly in opposing relationship to the direction of removal of the bearing assembly from its universal cross arm.

2. The universal joint puller as defined in claim 1 wherein said bearing means includes a tubular member.

3. The universal joint puller as defined in claim 1 wherein said bearing means is a generally tubular sleeve.

4. The universal joint puller as defined in claim 1 wherein said bearing means includes a tubular member, and said access means is an internal surface of said tubular member.

5. The universal joint puller as defined in claim 1 wherein said bearing means is a generally tubular sleeve, and said access means is an internal surface of said tubular sleeve.

6. The universal joint puller as defined in claim 1 wherein said force imposing means imposes an axial force against a bearing assembly in opposing relationship to the direction of removal of the bearing assembly form its universal cross arm.

7. The universal joint puller as defined in claim 1 wherein said force imposing means imposes a biasing force against a bearing assembly in opposing relationship to the direction of removal of the bearing assembly form its universal cross arm.

8. The universal joint puller as defined in claim 1 wherein said force imposing means imposes a spring-biasing force against a bearing assembly in opposing relationship to the direction of removal of the bearing assembly form its universal cross arm.

9. The universal joint puller as defined in claim 3 wherein said tubular sleeve includes a generally cylindrical body and a radially inwardly directed flange.

10. The universal joint puller as defined in claim 1 wherein said force imposing means is a compression spring.

11. The universal joint puller as defined in claim 1 wherein said bearing means is a generally tubular sleeve.

12. The universal joint puller as defined in claim 1 wherein said bearing means is a generally tubular sleeve, and said force imposing means is a spring located in said tubular sleeve.

13. The universal joint puller as defined in claim 12 wherein said tubular sleeve includes a generally cylindrical body and a radially inwardly directed flange.

14. The universal joint puller as defined in claim 13 including an abutment member disposed between said spring and said flange.

15. The universal joint puller as defined in claim 14 wherein said abutment member includes at least two cylindrical projections of different diameters to accommodate the removal of different sizes of bearing assemblies.

16. A universal joint puller for disassembling a universal joint including its cross and bearing assemblies from a drive shaft yoke, universal shaft yoke or the like comprising first and second relatively movable members adapted to be moved between a first relatively adjacent position and a second relatively spaced position, means for applying a force between said first and second members to move the same from said first position to said second position incident to removing a bearing assembly from an arm of an associated universal joint cross, a pair of flexible cable means for entraining arms of the cross generally normal to the arm from which a bearing assembly is to be removed, each of said pair of flexible cable means having opposite ends connected to said first member whereby upon operation of said force applying means said movable members are moved from said first position toward said second position, means movably carried by said first member for bearing against an end face of a yoke and preventing movement thereof during relative movement of said first and second members toward said second position, and means for imposing a force against a bearing assembly in opposing relationship to the direction of removal of the bearing assembly from its universal joint cross arm.

17. The universal joint puller as defined in claim 16 wherein said end face bearing means is movably carried by a pair of rods mounted for sliding movement relative to said first member.

18. The universal joint puller as defined in claim 17 wherein said end face bearing means includes a tubular member carried by said rods.

19. The universal joint puller as defined in claim 17 wherein said bearing means is a generally tubular sleeve carried by said rods.

20. The universal joint puller as defined in claim 17 wherein said force imposing means imposes a spring-biasing force against a bearing assembly in opposing relationship to the direction of removal of the bearing assembly from its universal joint cross arm.

21. The universal joint puller as defined in claim 17 wherein said bearing means further defines access means for receiving therein a bearing assembly upon the removal thereof from its associated universal joint cross arm upon said relative movement of said first and second members toward said second position.

22. The universal joint puller as defined in claim 19 wherein said bearing means further defines access means for receiving therein a bearing assembly upon the removal thereof from its associated universal joint cross arm upon said relative movement of said first and second members toward said second position.

23. The universal joint puller as defined in claim 1 including means for accurately axially locating said bearing means relative to the end face of a yoke from which a bearing assembly is to be removed.

24. The universal joint puller as defined in claim 1 including means projecting outwardly of said access means for accurately axially locating said bearing means relative to the end face of a yoke from which a bearing assembly is to be removed.

25. The universal joint puller as defined in claim 1 including means for accurately axially locating said bearing means relative to the end face of a yoke from which a bearing assembly is to be removed, and said force imposing means imposes its force through said axially locating means to the bearing assembly which is to be removed.

26. The universal joint puller as defined in claim 1 including means projecting outwardly of said access means for accurately axially locating said bearing means relative to the end face of a yoke from which a bearing assembly is to be removed, and said force imposing means imposes its force through said outwardly projecting means to the bearing assembly which is to be removed.

27. The universal joint puller as defined in claim 1 including means for accurately axially locating said bearing means relative to the end face of a yoke from which a bearing assembly is to be removed, and said axially locating means is a stepped disk-like plate.

28. The universal joint puller as defined in claim 1 including means for accurately axially locating said bearing means relative to the end face of a yoke from which a bearing assembly is to be removed, and said axially locating means is at least a double-stepped disk-like plate.

29. The universal joint puller as defined in claim 1 including means for accurately axially locating said bearing means relative to the end face of a yoke from which a bearing assembly is to be removed, said axially locating means is a stepped disk-like plate having a first diameter portion and a smaller second diameter portion, and said first diameter portion is located between said second diameter portion and said force imposing means.

30. The universal joint puller as defined in claim 1 including means for accurately axially locating said bearing means relative to the end face of a yoke from which a bearing assembly is to be removed, said axially locating means is at least a double-stepped disk-like plate having successive first, second and third diameter portions of which the first and third diameter portions are of largest and smallest diameters respectively, and said first diameter portion is located between said second diameter portion and said force imposing means.

31. A universal joint puller for disassembling a universal joint including its cross and bearing assembly from a drive shaft yoke, universal shaft yoke or the like comprising first and second relatively movable members adapted to be moved between a first relatively adjacent position and a second relatively spaced position, means for applying a force between said first and second members to move the same from said first position to said second position incident to removing a bearing assembly from an opening in an arm of an associated universal joint cross, a pair of flexible cable means for entraining arms of the cross generally normal to the arm from which a bearing assembly is to be removed, each of said pair of flexible cable means having opposite ends connected to said first member whereby upon operation of said force applying means said movable members are moved from said first position toward said second position, means for bearing against an end face of a yoke and preventing movement thereof during relative movement of said first and second members toward said second position, said bearing means further defining access means for receiving therein a bearing assembly upon the removal thereof from its associated universal joint cross arm opening upon said relative movement of said first and second members toward said second position, and means for accurately axially locating said bearing means relative to the axis of an opening of a yoke arm from which a bearing assembly is to be removed.

32. The universal joint puller as defined in claim 31 wherein said axially locating means projects at least partially outwardly of said access means.

33. The universal joint puller as defined in claim 31 wherein said axially locating means is a disk-like plate.

34. The universal joint puller as defined in claim 31 wherein said axially locating means is a stepped disk-like plate.

35. The universal joint puller as defined in claim 31 wherein said axially locating means is at least a double-stepped disk-like plate.

36. The universal joint puller as defined in claim 31 wherein said axially locating means is a stepped disk-like plate having a first diameter portion and a smaller second diameter portion, and said first diameter portion is located between said second diameter portion and said force imposing means.

37. The universal joint puller as defined in claim 31 wherein said axially locating means is at least a double-stepped disk-like plate having a first diameter portion and a smaller second diameter portion, and said first diameter portion is located between said second diameter portion and said force imposing means.

38. The universal joint puller as defined in claim 31 including means for imposing a force against a bearing assembly in opposing relationship to the direction of removal of the bearing assembly from its arm opening, and said force imposing means being generally housed within said access means.

39. The universal joint puller as defined in claim 31 including means for imposing a force against a bearing assembly in opposing relationship to the direction of removal of the bearing assembly from its arm opening, said force imposing means being generally housed within said access means, said axially locating means being at least partially housed in said access means, and said force imposing means imposes its force through said axially locating means to the bearing assembly which is to be removed from said arm opening.

40. The universal joint puller as defined in claim 38 wherein said access means is a generally tubular member, and said force imposing means is a spring generally housed in said generally tubular member.

41. The universal joint puller as defined in claim 39 wherein said access means is a generally tubular member, and said force imposing means is a spring generally housed in said generally tubular member.

42. The universal joint puller as defined in claim 38 wherein said axially locating means projects at least partially outwardly of said access means.

43. The universal joint puller as defined in claim 39 wherein said axially locating means projects at least partially outwardly of said access means.

44. The universal joint puller as defined in claim 38 wherein said axially locating means is a disk-like plate.

45. The universal joint puller as defined in claim 38 wherein said axially locating means is a stepped disk-like plate.

46. The universal joint puller as defined in claim 38 wherein said axially locating means is at least a double-stepped disk-like plate.

47. The universal joint puller as defined in claim 39 wherein said axially locating means is a disk-like plate.

48. The universal joint puller as defined in claim 39 wherein said axially locating means is a stepped disk-like plate.

49. The universal joint puller as defined in claim 39 wherein said axially locating means is at least a double-stepped disk-like plate.

50. The universal joint puller as defined in claim 40 wherein said axially locating means is a disk-like plate housed partially within and projecting in a direction outwardly of said generally tubular member against which bears the spring.

51. The universal joint puller as defined in claim 50 wherein said disk-like plate is stepped.

52. The universal joint puller as defined in claim 51 wherein said disk-like plate is double-stepped.

* * * * *